Dec. 27, 1966 J. DAVIDSE 3,294,897

CIRCUIT ARRANGEMENT IN A RECEIVER SUITED FOR THE RECEPTION OF A SIGNAL WHICH IS ENTIRELY OR PARTIALLY A SINGLE-SIDEBAND SIGNAL

Filed Dec. 23, 1963 3 Sheets-Sheet 1

INVENTOR.
JAN DAVIDSE
BY
Frank R. Jufari
AGENT

INVENTOR.
JAN DAVIDSE
BY
*Frank R. Jifari*
AGENT

Dec. 27, 1966 J. DAVIDSE 3,294,897
CIRCUIT ARRANGEMENT IN A RECEIVER SUITED FOR THE RECEPTION OF A SIGNAL WHICH IS ENTIRELY OR PARTIALLY A SINGLE-SIDEBAND SIGNAL
Filed Dec. 23, 1963 3 Sheets-Sheet 3

INVENTOR.
JAN DAVIDSE
BY
Frank R. Trifari
AGENT

United States Patent Office 3,294,897 Patented Dec. 27, 1966

3,294,897 CIRCUIT ARRANGEMENT IN A RECEIVER SUITED FOR THE RECEPTION OF A SIGNAL WHICH IS ENTIRELY OR PARTIALLY A SINGLE-SIDEBAND SIGNAL

Jan Davidse, Emmasingel, Eindhoven, Netherlands, assignor to North American Philips Company, Inc., New York, N.Y., a corporation of Delaware Filed Dec. 23, 1963, Ser. No. 332,761
Claims priority, application Netherlands, Jan. 11, 1963, 287,701
10 Claims. (Cl. 178—5.4)

Figure 1:
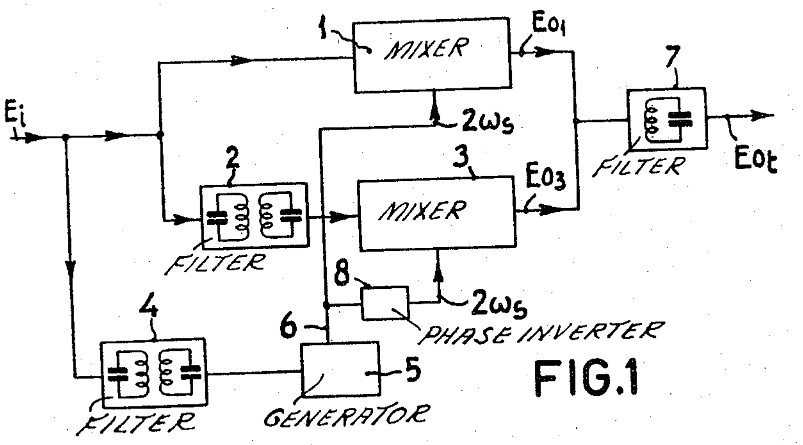

The invention relates to a circuit arrangement in a receiver suited for the reception of a signal which is, entirely or partially, a single-sideband signal, that is to say, a pure single-sideband signal or a combination of a single-sideband and a double-sideband signal.

As is known, the reception of a so-called single-sideband signal imposes exacting requirements upon the frequency characteristic and the tuning of the receiver, for, if such a signal is to be received with minimum distortion, the frequency characteristic of the receiver must have a so-called Nyquist edge about the carrier frequency $f_s$ modulated by the signal. This Nyquist edge has to satisfy the condition that, if the receiver is correctly tuned, the carrier frequency $f_s$ lies at such a point of this Nyquist edge (the so-called 6 db point of this edge) that the amplitude of the carrier, which is determined by the frequency characteristic, is attenuated by about 6 db with respect to the maximum amplitude of the sideband frequencies situated in the level portion of the frequency characteristic beyond the portion determined by the Nyquist edge. In addition, if this first condition is satisfied, the sum of the amplitudes of two arbitrary modulation frequencies situated symmetrically with respect to the carrier frequency $f_s$ and within the frequency range determined by the Nyquist edge must be twice the amplitude of the carrier. The second condition is satisfied with a highly accurate and hence highly critical trimming of the various circuits in the receiver. The first condition is only satisfied if the carrier frequency $f_s$ is accurately tuned to the 6 db point of the Nyquist edge.

It will, however, be appreciated that if the tuning is not correct, the two conditions are not satisfied in spite of a satisfactory variation of the Nyquist edge, and this gives rise to distortion of the received signals.

This is particularly significant in television receivers since such distortion gives rise to an incorrect transient response, and this becomes visible in the image displayed.

Moreover, in colour television receivers a disturbance of the brightness occurs because the colour signals modulating the sub-carrier also modulate the proper carrier as single-sideband signals only.

All these disadvantages can be avoided if in accordance with the invention the missing sideband is restored in the receiver. For this purpose the circuit arrangement in accordance with the invention is characterized in that for restoration of the missing sideband the receiver includes a mixer stage to which are applied the received signal and also the carrier which is regenerated in the receiver and has a frequency which is twice that of the carrier-modulated by the single-sideband signal, this mixer stage being adjusted so that the direct amplification is one half of the total conversion amplification.

In a colour television receiver, however, this problem also arises in the manipulation of the two colour signals modulating the sub-carrier in quadrature, that is to say, at right angles to one another, for a curcuit arrangement in a colour television receiver is to be suited to handling a television signal which contains a first component, which relates mainly to the brightness of a scene, and a second component, which comprises a sub-carrier modulated in quadrature by two signals either of which is built up to a certain combination of signals relating to the colour content of the scene, one of the said two signals, which is a wide-band signal, modulating the sub-carrier as a signal which partially is a single-sideband signal, that is to say, as a complete double-sideband signal with respect to the lower modulating frequencies and as a single-sideband signal with respect to the higher modulating frequencies, while the second of these two signals, which is a narrow-band signal, modulates the sub-carrier as a double-sideband signal with respect to the said lower modulation frequencies.

In handling the said second component an additional difficulty arises since we are concerned with two signals which modulate the sub-carrier in quadrature and one of which is a double-sideband signal and the other partially is a single-sideband signal. Nevertheless, the circuit arrangement in accordance with the invention enables the missing sideband of the wide-band signal to be restored if, according to the main feature of the invention, the circuit arrangement includes means for directly applying the second component to the first mentioned mixer stage, to which is also applied a signal regenerated in the receiver and having a frequency twice that of the sub-carrier and a phase twice that of the phase in which the wide band signal modulates the sub-carrier.

Figure 2:
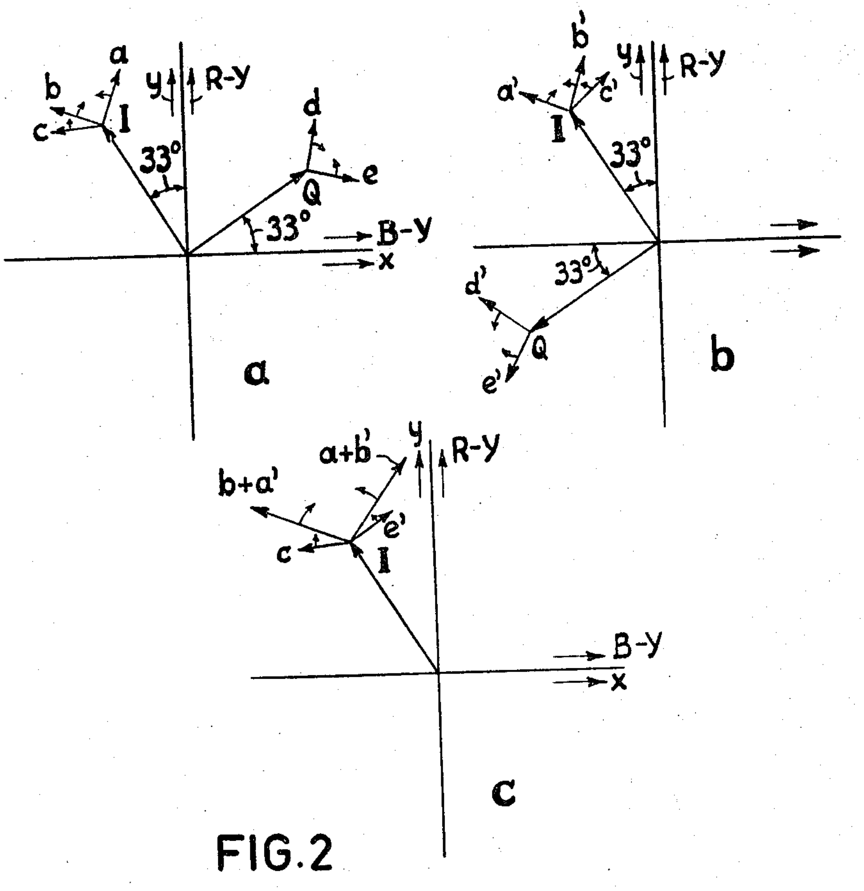
Figure 3:
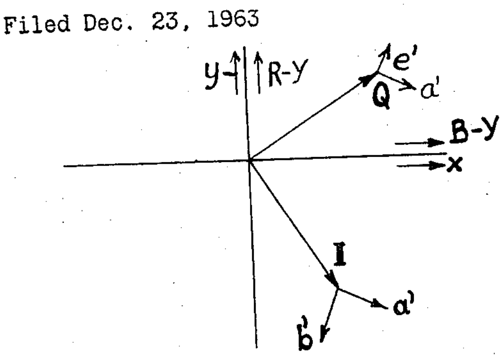
Figure 4:
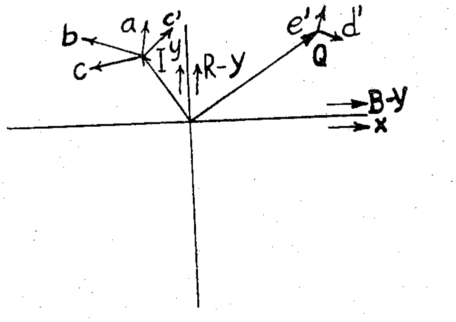
Figure 5:
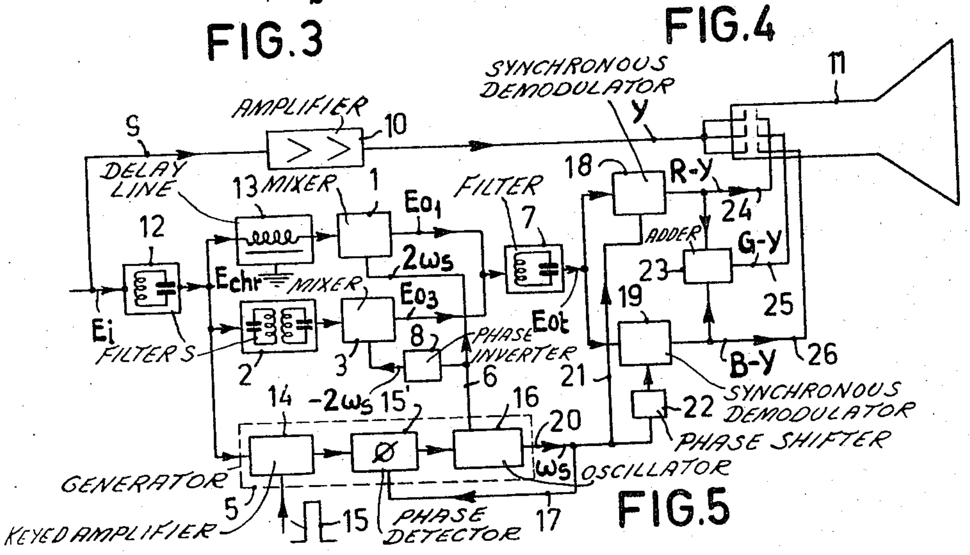
Figure 6:
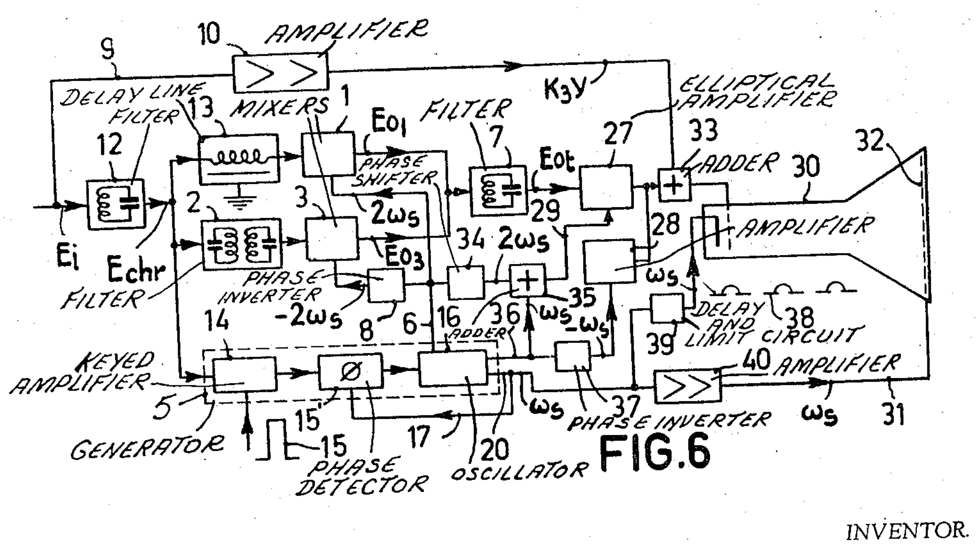
Figure 7:
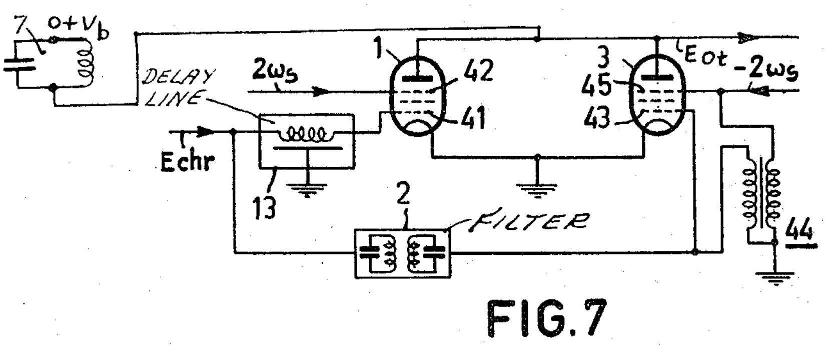
Figure 8:
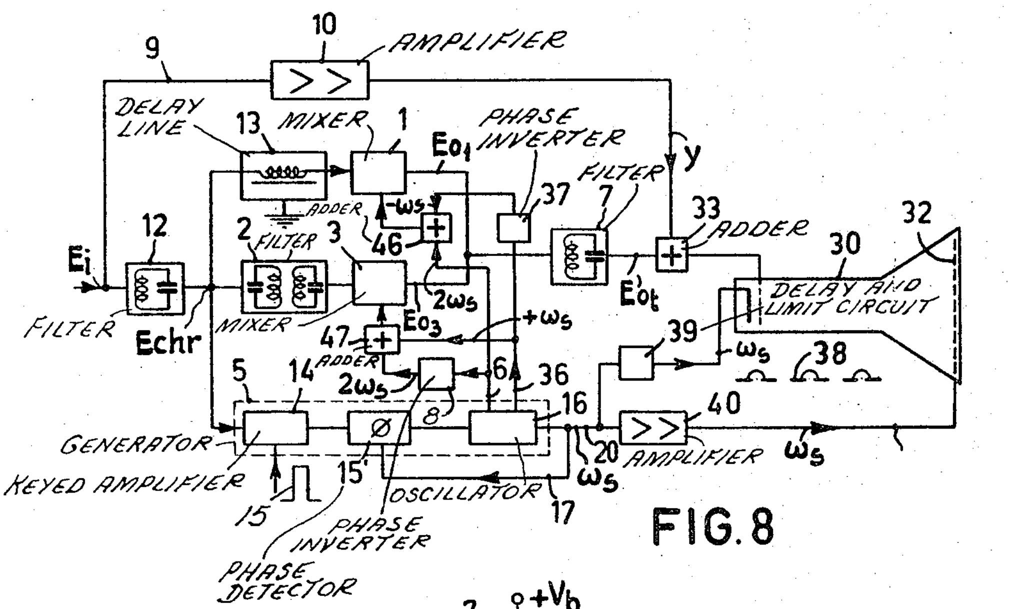
Figure 9:
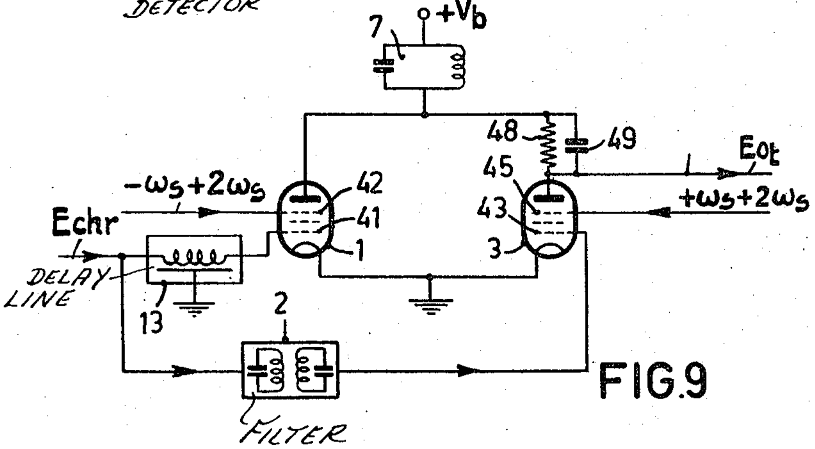

In order that the invention may readily be carried into effect, embodiments thereof will now be described, by way of example, with reference to the accompanying diagrammatic drawings, in which:

FIG. 1 is a circuit diagram of the circuit arrangement embodying the invention and including two mixer stages, FIG. 2 is a vector diagram illustrating the mixing process which takes place in one of the two mixer stages when the two colour signals modulating a sub-carrier in quadrature are applied thereto, FIG. 3 is a vector diagram illustrating the mixing process which takes place in the other of the two mixer stages when the two colour signals modulating the sub-carrier in quadrature are applied thereto through a narrow-band filter, FIG. 4 is a vector diagram illustrating the signal obtained by adding the two output signals of the two mixer stages to one another, FIG. 5 is a circuit diagram of a part of a colour television receiver provided with a three-gun display tube and suitable for employing the circuit arrangement in accordance with the invention, FIG. 6 is a circuit diagram of part of a colour television receiver provided with a single-gun display tube and suitable for employing the circuit arrangement in accordance with the invention, FIG. 7 is a circuit diagram of a possible embodiment of the two mixer stages embodying the invention when used in a colour television receiver as shown in FIG. 5 or 6, FIG. 8 is a circuit diagram of part of a colour television receiver provided with a single-gun display tube and suitable for employing the circuit arrangements embodying the invention, said circuit arrangements effecting not only the restoration of the missing sideband but also the conversion of the received colour television signal into a monochrome signal and in a dot-sequential signal, and FIG. 9 is a circuit diagram of a possible embodiment of the two mixer stages embodying the invention when used in the colour television receiver of FIG. 8.

Referring now to FIG. 1, an incoming amplitude-modulated signal is represented by $E_i$. This signal may be a single-sideband signal or a combination of a single-sideband signal and a double-sideband signal and may be received with suppressed carrier. If the carrier is suppressed, however, it is desirable for this carrier to be separately transmitted since the availability of the carrier is a requirement for the use of the circuit arrangement in accordance with the invention.

It is true that when the carrier is suppressed, it may be restored from the received signal by limiting and filtering, however, the result never is completely free from distortion.

Assuming firstly that a combined single-sideband and double-sideband signal including the carrier is received, the input signal $E_i$ can be expressed by:

$$E_i = A_o \cos \omega_s t + \sum_{\omega_p=\omega_1}^{\omega_2} A_m\{\cos (\omega_s+\omega_p)t + \cos (\omega_s-\omega_p)t\} + \sum_{\omega_p=\omega_2}^{\omega_3} A_m \cos (\omega_s+\omega_p)t \quad (1)$$

In this equation, $\omega_s=2\pi f_s$ is the angular frequency of the carrier, $\omega_p=2\pi f_p$ is the angular frequency of the modulation signal modulating the carrier, $\omega_1=2\pi f_1$ is the lowest angular frequency modulating the carrier, $\omega_2=2\pi f_2$ the highest angular frequency by which the received signal is modulated as a double-sideband signal, $\omega_3=2\pi f_3$ the highest angular frequency modulating the carrier, $A_o$ the amplitude of the carrier and $A_m$ the amplitude of the sideband.

From Equation 1 it follows that between the angular frequencies $\omega_1$ and $\omega_2$ the signal has an upper sideband $(\omega_s+\omega_p)$ and a lower sideband $(\omega_s-\omega_p)$. Between the angular frequencies $\omega_2$ and $\omega_3$ the signal has an upper sideband only.

The symbol $$\sum_{\omega_p=\omega_1}^{\omega_3}$$

indicates that for the double-sideband portion of the signal the angular frequency $\omega_p$ may assume any value between the angular frequencies $\omega_1$ and $\omega_2$. The symbol $$\sum_{\omega_p=\omega_1}^{\omega_3}$$

indicates that for the single-sideband portion of the signal the angular frequency $\omega_p$ may assume any value between the angular frequencies $\omega_2$ and $\omega_3$. Although as a rule $\omega_1<\omega_2<\omega_3$, so that the double-sideband signal contains the lower modulation frequencies, this is not absolutely necessary for the invention.

Furthermore, the single-sideband portion considered is the upper sideband. However, if the single-sideband portion comprises only the lower sideband, the invention can be used without need for any additional step, as will be described hereinafter with reference to a colour television signal.

In the circuit arrangement of FIG. 1, the input signal $E_i$ is applied directly to a first mixer stage 1, through a narrow-band filter 2 to a second mixer stage 3 and through a likewise narrow-band filter 4 to a stage 5. The filter 4 has a very high Q-factor and serves to eliminate the carrier $A_o \cos \omega_s t$. If the angular frequency $\omega_1$ has such a value relative to the angular frequency $\omega_s$ that there are no longer any sidebands in the output signal of the filter 4, the stage 5 may be only a frequency doubling stage. Otherwise the stage 5 must include a limiting circuit which removes and residual amplitude modulation before the signal is applied to the frequency doubling stage.

Alternatively, a pilot signal may be transmitted instead of the carrier. In this event the filter 4 eliminates the pilot signal from the received signal and the stage 5 is a generator which is synchronised by this pilot signal. As is known, if such a generator is correctly adjusted, it may deliver not only a signal at the angular frequency $\omega_s$ but also a signal at twice the angular frequency, $2\omega_s$.

In all these cases a signal of the shape $B_o \cos 2\omega_s t$ may be derived from the output signal 6 of the stage 5.

This signal is applied to second input terminal of the first mixer stage 1.

If the stage 1 normally amplifies the incoming signal $K_1$ times and $K_2$ is a factor proportional to the conversion amplification, the output signal of the stage 1 may be written:

$$E_{o1}=(K_1+K_2B_o \cos 2\omega_s t)E_1$$

By writing $$\frac{K_2}{K_1}B_o=2$$

the output signal $E_{o1}$ becomes:

$$E_{o1}=K_1\Big[A_o \cos \omega_s t+\sum_{\omega_p=\omega_1}^{\omega_2} A_m\{\cos (\omega_s+\omega_p)t+\cos (\omega_s-\omega_p)t\}+\sum_{\omega_p=\omega_2}^{\omega_3} A_m\{\cos (\omega_s-\omega_p)t\}\Big]$$
$$+2K_1\Big[\frac{1}{2}A_o \cos \omega_s t+\sum_{\omega_p=\omega_1}^{\omega_2} A_m\{\cos (\omega_s-\omega_p)t+\cos (\omega_s+\omega_p)t\}+\sum_{\omega_p=\omega_2}^{\omega_3} A_m\{\cos (\omega_s-\omega_p)t\}\Big] \quad (2)$$

in which equation the terms containing $2\omega_s$ and $3\omega_s$ are omitted because they are eliminated by a filter 7 tuned to the frequency $f_s$. The Equation 2 shows that by choosing $$\frac{K_2}{K_1}B_o=2$$

for the range between the angular frequencies $\omega_2$ and $\omega_3$ the conversion amplification of the stage 1 converts the upper sideband into a lower sideband having the same amplitude as the original upper sideband.

Hence, the Equation 2 may be written:

$$E_{o1}=K_1\Big[2A_o \cos \omega_s t+\sum_{\omega_p=\omega_1}^{\omega_2} 2A_m\{\cos (\omega_s+\omega_p)t+\cos (\omega_s+\omega_p)t\}+\sum_{\omega_p=\omega_2}^{\omega_3} A_m\{\cos (\omega_s+\omega_p)t+\cos (\omega_s-\omega_p)t\}\Big] \quad (3)$$

Equation 3 shows that, although the signal has become a complete double-sideband signal, the part comprised within the range determined by the angular frequencies $\omega_2$ and $\omega_3$ has an amplitude which is one half of the amplitude of the part comprised within the range determined by the angular frequencies $\omega_1$ and $\omega_2$.

If this is acceptable, the second mixer stage 3 and the filter 2 may be omitted.

They may also be omitted if a pure single-sideband signal is received, for in this event in the Equation 1 the term indicating the double-sideband signal within the range determined by the angular frequencies $\omega_1$ and $\omega_2$ may be omitted. As a result, the corresponding term of the Equation 3 may also be omitted, so that the signal represented thereby has become a complete double-sideband signal having sidebands determined by the range between the angular frequencies $\omega_2$ and $\omega_3$.

If, however, a signal is received of the form represented by Equation 1 and if it is desired to obtain, by restoring the missing sideband, a double-sideband signal having the same amplitude throughout the entire frequency range, this may be achieved by applying the input signal $E_i$ not only to the mixer stage 1 but also, through the filter 2, to the mixer stage 3. Although the filter 2 is a narrow-band filter, its bandwidth is greater than that of the filter 4. Hence the single sideband is eliminated in this filter, so that the output signal of the filter 2 may be written:

$$E_i' = A_o \cos \omega_s t + \sum_{\omega_p=\omega_1}^{\omega_2} A_m \{\cos (\omega_s+\omega_p)t + \cos (\omega_s-\omega_p)t\} \quad (4)$$

The signal taken from the terminal 6 has its phase inverted and is stepped up in a phase inverter stage 8, so that the output signal of the stage 8 may be written:

$$-C_o \cos 2\omega_s t$$

If the mixer stage 3 is identical with the mixer stage 1, the output signal $E_{o3}$ of the stage 3 may be written:

(5)

$$E_{o3} = E_i' K_1\left(1-\frac{K_2}{K_1}C_o \cos 2\omega_s t\right) = K_1\left[A_o \cos \omega_s t + \sum_{\omega_p=\omega_1}^{\omega_2} A_m \{\cos (\omega_s+\omega_p)t + \cos (\omega_s-\omega_p)t\}\right] - K_1 \cdot \frac{K_2}{K_1}\frac{C_o}{2}\left[A_o \cos \omega_s t + \sum_{\omega_p=\omega_1}^{\omega_2} A_m \{\cos (\omega_s-\omega_p)t + \cos (\omega_s+\omega_p)t\}\right]$$

in which equation the terms containing $2\omega_s$ and $3\omega_s$ are omitted because they will also be eliminated by the filter 7.

The output signals of the stages 1 and 3 represented by the Equations 3 and 5 are added, for example, by using the filter 7 as a common output impedance for the stages 1 and 3.

The output sum signal may be written:

(6)

$$E_{ot} = E_{o1} + E_{o3} = K_1\left[\left(3A_o - \frac{K_2}{K_1}C_o A_o\right) \cos \omega_s t + \left(3A_m - \frac{K_2}{K_1}\frac{C_o}{2}A_m\right) \sum_{\omega_p=\omega_1}^{\omega_2} \{\cos (\omega_s+\omega_p)t + \cos (\omega_s-\omega_p)t\} + A_m \sum_{\omega_p=\omega_2}^{\omega_3} \{\cos (\omega_s+\omega_p)t + \cos (\omega_s-\omega_p)t\}\right]$$

This is a complete double-sideband signal having the same amplitude for the range determined by the angular frequencies $\omega_1$ and $\omega_2$ as for the range determined by the angular frequencies $\omega_2$ and $\omega_3$, if:

$$3A_m - \frac{K_2}{K_1}\frac{C_o}{2}A_m A_m \quad (7)$$

that is to say if:

$$\frac{K_2}{K_1}C_o = 4$$

Hereinbefore it has been shown that it is required that:

$$\frac{K_2}{K_1}B_o = 2$$

so that the Equation 7 is satisfied if:

$$C_o = 2B_o$$

in other words, the output signal taken from the terminal 6 is to be stepped up by a factor 2 in the stage 8. This may be effected, for example, by designing the stage 8 as a transformer the secondary winding of which has twice the number of turns of the primary winding.

The mixer stages 1 and 3 may be multigrid tubes, the signals $E_i$ and $E_i'$ being applied to the first control grids and the signals $B_o \cos 2\omega_s t$ and $-C_o \cos 2\omega_s t$ to the second control grids of these tubes. In this case multiplicative mixing is performed.

The signal obtained by the addition of the output signals of the mixer stages 1 and 3 may further be manipulated in the receiver in a usual manner without the occurrence of the disadvantages inherent in the single-sideband signal.

A special use of a second arrangement in accordance with the invention may be made in a television receiver. In a television receiver suited to the reception of a black-and white signal, the received signal, which is not a pure single-sideband signal, may be converted in the above described manner into a complete double-sideband signal before applying it to the detector, which as a rule will be a detector following the modulation frequency.

Another use may be found in a colour television receiver, for in colour television the single-sideband effect produces distortion of the envelope of the received colour television signal, which manifests itself as a variation of the brightness in the displayed colour television image. With negative modulation of the television signal the brightness is decreased by this effect and with positive modulation it is increased.

These disadvantages also are avoided if, in accordance with the invention, the received colour television signal is converted at the receiver end into a double-sideband signal before it is applied to the detector.

In addition to the disadvantages with respect to the brightness signal, in receiving a single-sideband colour television signal the handling of this signal after it has been detected for the first time in the receiver provides further difficulty, since the colour signals themselves modulate a sub-carrier in quadrature, partially as a single-sideband signal and partially as a complete double-sideband signal.

Hereinafter the NTSC (National Television System Committee) system developed in the United States of America will only be considered. It will, however, be appreciated that any colour television system in which the two composite colour signals modulate the sub-carrier in quadrature while one colour signal is a wide-band signal and partially a single-sideband signal, partially a double-sideband signal, and the other colour signal is a narrow-band signal and a complete double-sideband signal, may be improved with the aid of a circuit arrangement in accordance with the invention.

The incoming NTSC signal when detected once has the following shape:

$$E_i = Y + \sum_{\omega_p=\omega_1}^{\omega_2} I[\cos \{(\omega_s+\omega_p)t+\psi\} + \cos \{(\omega_s-\omega_p)t+\psi\}] + \sum_{\omega_p=\omega_2}^{\omega_3} I \cos \{\omega_s-\omega_p)t+\psi\} + \sum_{\omega_p=\omega_1}^{\omega_2} Q[\sin\{(\omega_s+\omega_p)t+\psi\} + \sin \{(\omega_s-\omega_p)t+\psi\}] \quad (8)$$

In Equation 8, $Y=0.30R+0.11B+0.59G$ is the brightness signal, $2I\cos\omega_p t=2(0.60R-0.32B-0.28G)\cos\omega_p t$ is the wide-band colour signal which modulates the sub-carrier at the angular frequency $\omega_s$ as a double-sideband signal for the range between the angular frequencies $\omega_1$ and $\omega_2$ and as a single-sideband signal for the range between the angular frequencies $\omega_2$ and $\omega_3$, $2Q\cos\omega_p t=2(0.21R+0.31B-0.52G)\cos\omega_p t$ is the narrow-band colour signal modulating the sub-carrier as a complete double-sideband signal in quadrature with respect to the I-signal, and $\psi$ a phase angle, which is 33° in the NTSC system.

As the equations for the Y, I and Q signals show, these signals are composed of the red (R), blue (B) and green (G) colour signals delivered by the cameras at the transmitter end and required to excite the red, blue and green phosphors of the display tubes to which they are applied.

In addition to the signal shown by Equation 8, the once detected signal contains a component $-M\sin\omega_s t$, which represents the transmitted sub-carrier and occurs on the back porch of each horizontal synchronising pulse. With reference to FIG. 5 it will be explained how this co-transmitted sub-carrier is used in the receiver to produce a sub-carrier signal, however, for the time being it is assumed that a signal of the shape:

$$2\cos(2\omega_s t+2\psi) \qquad (9)$$

appears at the terminal 6 of the stage 5 of FIG. 1.

It will also be explained with reference to FIG. 5 how the brightness signal Y is eliminated from the signals applied to the mixer stages 1 and 3 so that only the colour signals I and Q as given in Equation 8 are applied to these mixer stages.

To clarify the mixing processes which take place in the stages 1 and 3, in FIG. 2*a* the incoming colour signals I and Q are shown with the aid of a vector diagram.

This diagram shows that the I signal modulating the sub-carrier at an angle $\psi=33°$ with respect to the $y$ axis comprises an upper sideband:

$$a=\sum_{\omega_p=\omega_1}^{\omega_2} I\cos\{(\omega_s+\omega_p)t+\psi\}$$

a lower sideband:

$$b=\sum_{\omega_p=\omega_1}^{\omega_2} I\cos\{(\omega_s-\omega_p)t+\psi\}$$

and a single lower sideband for the range of the higher angular frequencies $\omega_2$ and $\omega_3$:

$$c=\sum_{\omega_p=\omega_2}^{\omega_3} I\cos\{\omega_s-\omega_p)t+\psi\}$$

This diagram further shows that the Q signal, which modulates the sub-carrier at an angle $\psi=33°$ with respect to the $x$ axis, comprises an upper sideband:

$$e=\sum_{\omega_p=\omega_1}^{\omega_2} Q\sin\{(\omega_s+\omega_p)t+\psi\}$$

and a lower sideband:

$$d=\sum_{\omega_p=\omega_1}^{\omega_2} Q\sin\{(\omega_s-\omega_p)t+\psi\}$$

This incoming signal is directly applied to the mixer stage 1, to which is also applied the signal taken from the stage 5.

In a manner similar to that described hereinbefore it can be shown that the incoming signal is multiplied by a factor:

$$K_1\{1+2\cos(2\omega_s t+2\psi)\}$$

so that, allowance being made for the filter 7, the output signal of the mixer stage 1 can be written:

$$E_{o1}=K_1\Bigg[\sum_{\omega_p=\omega_1}^{\omega_2}=\omega_1 I[\cos\{(\omega_s+\omega_p)t+\psi\}+\cos\{(\omega_s-\omega_p)t+\psi\}]+\sum_{\omega_p=\omega_2}^{\omega_3} I[\cos\{(\omega_s-\omega_p)t+\psi\}]+$$
$$\sum_{\omega_p=\omega_1}^{\omega_2} Q[\sin\{(\omega_s+\omega_p)t+\psi\}+\sin\{(\omega_s-\omega_p)t+\psi\}]+\sum_{\omega_p=\omega_1}^{\omega_2} 2\frac{I}{2}[\cos\{(\omega_s-\omega_p)t+\psi\}+\cos\{(\omega_s+\omega_p)t+\psi\}]+$$
$$\sum_{\omega_p=\omega_2}^{\omega_3} 2\frac{I}{2}[\cos\{(\omega_s+\omega_p)t+\psi\}]+-\sum_{\omega_p=\omega_1}^{\omega_2} 2\frac{Q}{2}[\sin\{\omega_s-\omega_p)t+\psi\}+\sin\{(\omega_s+\omega_p)t+\psi\}]\Bigg] \qquad (10)$$

The first five terms of Equation 10 show that the incoming signal appears at the output of the mixer stage 1 after being amplified $K_1$ times.

The second five terms of Equation 10 show that the signals obtained by conversion have a shape similar to that of the non-converted signals but that owing to the multiplication by the term $2\cos(2\omega_s t+2\psi)$ a lower sideband has become an upper sideband and conversely. This is achieved by multiplying the incoming signal by a signal which not only has an angular frequency twice that of the sub-carrier but also is at the phase angle $(2\psi)$ to the positive $y$ axis twice that of the phase angle $(\psi)$ at which the wide-band signal I modulates the sub-carrier, for by the conversion the upper sideband $a$ becomes a lower sideband:

$$a'=\sum_{\omega_p=\omega_1}^{\omega_2} 2\frac{I}{2}\cos\{(\omega_s-\omega_p)t+\psi\}$$

the lower sideband $b$ becomes an upper sideband:

$$b'=\sum_{\omega_p=\omega_1}^{\omega_2} 2\frac{I}{2}\cos\{(\omega_s+\omega_p)t+\psi\}$$

the single lower sideband $c$ becomes an upper sideband:

$$c'=\sum_{\omega_p=\omega_2}^{\omega_3} 2\frac{I}{2}\cos\{(\omega_s+\omega_p)t+\psi\}$$

the upper sideband $e$ becomes a lower sideband:

$$e'=-\sum_{\omega_p=\omega_1}^{\omega_2} 2\frac{Q}{2}\sin\{(\omega_s-\omega_p)t+\psi\}$$

and the lower sideband $d$ becomes an upper sideband:

$$d'=-\sum_{\omega_p=\omega_1}^{\omega_2} 2\frac{Q}{2}\sin\{(\omega_s+\omega_p)t+\psi\}$$

The last five terms are shown in FIG. 2*b*, which clearly shows that as a result of the conversion in the mixer stage 1 the I signal still is at the same angle to $y$ axis, still has the same lower and upper sidebands for the range between the angular frequencies $\omega_1$ and $\omega_2$, but that these sidebands $a'$ and $b'$ have changed places with respect to the sidebands $a$ and $b$, while the I signal has acquired an upper sideband $c'$ for the range between the angular frequencies $\omega_2$ and $\omega_3$, which has the same amplitude as the original sideband $c$.

FIG. 2*b* further shows that the Q signal has retained the same shape as in the original signal, but is shifted 180° in phase with respect thereto, while the sidebands $e$ and $d$ have become sidebands $e'$ and $d'$ which have changed places.

Consequently, the Q signal is no longer contained in the output signal $E_{o1}$ of the mixer stage 1. Hence this output signal may alternatively be written:

(10')

$$E_{o1}=K_1\left[\sum_{\omega_p=\omega_1}^{\omega_2} 2I\,[\cos\{(\omega_s+\omega_p)t+\psi\}+\cos\{(\omega_s-\omega_p)t+\psi\}]+\sum_{\omega_p=\omega_2}^{\omega_3} I\,[\cos\{(\omega_s+\omega_p)t+\psi\}+\cos\{(\omega_s-\omega_p)t+\psi\}]\right]$$

The signal represented by the Equations 10 and 10' is also shown in FIG. 2*c* and is the sum of the vector diagrams of FIGS. 2*a* and 2*b*. Thus, the output signal of the mixer stage 1 has become a complete double-sideband signal which, however, for the range between the angular frequencies $\omega_1$ and $\omega_2$ has an amplitude which is twice that for the range between the angular frequencies $\omega_2$ and $\omega_3$. This situation may be accepted and the result I signal may be applied to a synchronous demodulator, which demodulates this signal in the said sense (that is to say, at an angle of 33° to the positive $y$ axis). In this manner a demodulated I signal including all the desired frequencies is obtained, however, for the modulation frequencies between $\omega_1$ and $\omega_2$ it has an amplitude twice that for the modulation frequencies between $\omega_2$ and $\omega_3$.

If an output signal $E_{o1}$ as shown by the Equations 10 and 10' is available, however, this disadvantage may be obviated in various manners.

Firstly, the incoming signal may be so filtered that the upper frequency range between the angular frequencies $\omega_2$ and $\omega_3$ is not transmitted. Thus, after this elimination a signal is available which has the shape:

(11)

$$E_{o1}'=\left[\sum_{\omega_p=\omega_1}^{\omega_2} I\,[\cos\{(\omega_s+\omega_p)t+\psi\}+\cos\{(\omega_s-\omega_p)t+\psi\}]+\sum_{\omega_p=\omega_1}^{\omega_2} Q\,\sin\{(\omega_s+\omega_p)t+\psi\}+\sin\{(\omega_s-\omega_p)t+\psi\}]\right]$$

If the signal represented by the Equation 11 is amplified $K_1$ times and then subtracted from the signal represented by the Equation 10', we have:

(12)

$$E_{o1}''=E_{o1}-K_1E_{o1}'=K_1\left[\sum_{\omega_p=\omega_1}^{\omega_2} I\,[\cos\{(\omega_s+\omega_p)t+\psi\}+\cos\{(\omega_s-\omega_p)t+\psi\}]+\sum_{\omega_p=\omega_2}^{\omega_3} I\,[\cos\{(\omega_s+\omega_p)t+\psi\}+\cos\{(\omega_s-\omega_p)t+\psi\}]-\sum_{\omega_p=\omega_1}^{\omega_2} Q\,[\sin\{(\omega_s+\omega_p)t+\psi\}+\sin\{(\omega_s-\omega_p)t+\}]\right]$$

The signal $E_{o1}''$ is a complete double-sideband signal, in which the I signal has the same amplitude for the entire frequency range between the angular frequencies $\omega_1$ and $\omega_3$, but in which the Q signal has a phase opposite to that of the I signal.

This provides no difficulty. The signal represented by the Equation 12 may be applied to two synchronous demodulators, one of which demodulates in the I direction (that is to say, at an angle of 33° to the positive $y$ axis) and the other in the Q direction (that is to say, at an angle of 213° on the positive $x$ axle). The I demodulator produces the desired I signal containing all the modulation frequencies between $\omega_1$ and $\omega_3$ with the correct amplitudes. The Q demodulator produces the desired Q signal containing the modulation frequencies between $\omega_1$ and $\omega_2$. Since the signal represented by the Equation 12 is a complete double-sideband signal, the I signal will produce no cross-talk to the Q signal in the Q demodulator.

As is known, however, demodulation in the so-called $(R-Y)$ and $(B-Y)$ directions is preferred to demodulation in the I and Q directions, and this is readily possible with respect to a signal as represented by the Equation 12. (As FIG. 2 shows, in the NTSC signal the $(R-Y)$ direction coincides with the positive $y$ axis and the $(B-Y)$ direction coincides with the positive $x$ axis. Since the X signal occurs in the signal $E_{o1}''$ with a negative phase, the $(R-Y)$ and $(B-Y)$ directions no longer coincide with the said axes but will be at a certain angle thereto, which angle has to be allowed for in demodulation.) Thus, the red $(R-Y)$ and the blue $(B-Y)$ colour difference signals become directly available and from these the green $(G-Y)$ colour difference signal may readily be deduced. The three colour difference signals may directly be applied to the three control electrodes of a three-gun colour display tube. This greatly simplifies the demodulation process since it enables the matrix circuit which derives the desired red (R) blue (B) and green (G) colour signals from the demodulated I and Q signals together with the separately amplified brightness signal Y, to be dispensed with. In addition, such a matrix circuit attenuates the demodulated signal, so that its output must be amplified again. Hence, by doing without the matrix circuit this additional amplifier stage may also be dispensed with. A method by which in the ultimate output signal $E_{ot}$ the Q signal is obtained in the correct phase relative to the I signal, will now be described.

The incoming signal is also applied, through the filter 2, to the second mixer stage 3. The filter 2 eliminates the angular frequencies between $\omega_2$ and $\omega_3$ from the incoming signal, so that the signal at the output of the filter 2 has the shape represented by the Equation 11.

This signal must only be converted in the mixer stage 3. That is to say, the signal represented by the Equation 11 must be multiplied in the mixer stage 3 by a factor $$-2\cos(2\omega_s t+2\psi) \qquad (13)$$

or, in other words, the signal represented by the Equation 11 is not allowed to penetrate as such to the output of the mixer stage 3. This may readily be achieved by designing the mixer stage 3 as a push-pull mixer stage, for example, by connecting two multigrid tubes in push-pull. The signal represented by the Equation 11 is then applied in phase to the first control grids of the said two tubes, and the signal represented by the Equation 13 is applied in opposite phase to the second control grids.

It should be noted that the signal represented by the Equation 13 appears at the output of the phase inverter stage 8, which in this case only has to invert the phase of the signal taken from the terminal 6 and represented by the Equation 9, but does not have to step up this signal.

Assuming that the push-pull mixer stage 3 has a conversion amplification factor $K_1$, the output signal, after passing through the filter 7, has the following shape:

$$E_{o3}=-K_1\,2\cos(2\omega_s t+2\psi)$$

(14)

$$E_{o1}'=-K_1\left[\sum_{\omega_p=\omega_1}^{\omega_2} I\,[\cos\{(\omega_s-\omega_p)t+\psi\}+\cos\{(\omega_s+\omega_p)t+\psi\}]+\sum_{\omega_p=\omega_1}^{\omega_2} Q\sin\{(\omega_s-\omega_p)t+\psi\}+\{\sin(\omega_s+\omega_p)t+\psi\}]\right]$$

The signal represented by the Equation 14 is shown in FIG. 3, in which the sidebands $a'$, $b'$, $e'$ and $d'$ have the same meanings as in FIG. 2*b* and FIG. 2*c*.

The total output signal $E_{ot}$ of the stages 1 and 3 is the sum of the signals represented by the Equations 10′ and 14, and consequently:

(15)

$$E_{ot}=E_{o1}+E_{o3}=K_1\left[\sum_{\omega_p=\omega_1}^{\omega_2} I\,[\cos\{(\omega_s+\omega_p)t+\psi+\cos(\omega_s-\omega_p)t+\psi\}]+\sum_{\omega_p=\omega_2}^{\omega_3} I\,[\cos\{(\omega_s+\omega_p)t+\psi\}+\cos\{\omega_s-\omega_p)t+\psi\}]+\sum_{\omega_p=\omega_1}^{\omega_2} Q\,[\sin\{(\omega_s+\omega_p)t+\psi\}+\sin\{(\omega_s-\omega_p)t+\psi\}]\right]$$

Thus, the total output signal $E_{ot}$ shown in FIG. 4 is a complete double-sideband signal comprising both the I and the Q signals in the correct phase and having the same amplitudes.

This signal can directly be used both for synchronous demodulation in the $(R-Y)$ and $(B-Y)$ directions and for conversion in a so-called elliptical amplifier, which converts the double side-band signal represented by the Equation 15 not only into a monochrome correction signal $(M-Y)$ but also into a dot-sequential signal, which signals may directly be applied to a control electrode of a single-gun colour display tube, for example, the chromatron or Lawrence tube. Alternatively, these monochrome and dot-sequential signals may modulate an indexing signal taken from an index tube (Apple tube) before being applied to a control grid of such a tube, for the signal represented by the Equation 15, is a complete double-sideband signal so that it is immaterial in which direction it is demodulated, because with such a signal so-called quadrature cross-talk is impossible. For the same reason elliptical amplification in an arbitrary direction is possible, so that from the I signal a dot-sequential signal may be obtained while retaining the higher frequencies, without the occurrence of the so-called quadrature deviations.

An example of demodulation in the $(R-Y)$ and $(B-Y)$ directions is shown in FIG. 5, while conversion with the aid of an elliptical amplifier is shown in FIG. 6.

In FIG. 5, the incoming signal $E_1$ has the shape represented by the Equation 8. This signal may be obtained in known manner by amplifying the signal modulating the carrier and subsequently detecting it in a peak detector. Alternatively, however, the signal modulating the carrier, which partially is a single-sideband signal, may be converted with the aid of a circuit arrangement as shown in FIG. 1 into a complete double-sideband signal as represented by the Equation 6. Obviously, in this case $A_m$ represents a signal of varying amplitude as represented by the Equation 8, and equally obviously the angular frequencies $\omega_s$, $\omega_p$, $\omega_1$, $\omega_2$ and $\omega_3$ are to be differently interpreted in the Equations 6 and 8. As mentioned hereinbefore, this step provides not only an improved transient response but also an improved reproduction of the brightness.

The signal $E_1$ represented by the Equation 8 is applied through a lead 9 to a brightness amplifier 10, which in known manner amplifies the brightness signal Y and then applies it to the three cathodes of the three-gun display tube 11. The signal $E_1$ is also applied through a filter 12 to the converting circuit in accordance with the invention and to the stage 5. The filter 12 is a so-called colour filter and eliminates the brightness signal Y from the incoming signal $E_1$. Therefore, the output signal of the filter 12 is denoted by $E_{chr}$ to show that the signal $E_{chr}$ contains only the colour signals I and Q and the co-transmitted sub-carrier $-M\sin\omega t$.

The signal $E_{chr}$ is applied through a delay line 13 to the mixer stage 1 and through the filter 2 to the mixer stage 3. The delay line 13 has the same transit time as the filter 2 in order to equalise any transit time deviations, since otherwise the addition of the output signals $E_{o1}$ and $E_{o3}$ in order to obtain the signal represented by the Equation 15 cannot be correctly performed.

The signal $E_{chr}$ is also applied to the stage 5. This stage comprises a keyed amplifier 14, to which line flyback pulses 15 produced by the horizontal deflection circuit of the receiver are applied. These line flyback pulses render the amplifier 14 conductive during the occurrence of the line synchronising pulses and their front and back porches. Since the co-transmitted subcarrier $-M\sin\omega t$ occurs during the back porch, this keying ensures that the I and Q signals cannot penetrate to the stage 5 but the co-transmitted subcarrier can penetrate thereto. The output signal of the amplifier 14 is applied to a phase detector 15′, to which is also applied, through a lead 17, a signal taken from a local oscillator 16. As a result, the phase detector 15′ produces a control voltage by which the local oscillator 16 may be synchronised. From the terminal 6 is taken the signal represented by the Equation 9, which is converted in the phase inverter stage 8 into a signal represented by the Equation 13. As described hereinbefore, an output signal $E_{ot}$ as represented by the Equation 15 is then taken from the filter 7. The signal $E_{ot}$ is applied to a first synchronous demodulator 18, which demodulates in the $(R-Y)$ direction, and to a second synchronous demodulator 19, which demodulates in the $(B-Y)$ direction. For this purpose, the signal $D\cos\omega_s t$ taken from the output terminal 20 of the oscillator 16 is applied through a line 21 to the synchronous demodulator 18. For the NTSC signal, with a relative conversion amplification of unity in the synchronous demodulator 18, D must be set at 1.14.

By a phase shifting network 22 in the signal taken from the output terminal 20 is shifted in phase and modified in amplitude so that a signal of the shape $F\sin\omega_s t$ is applied to the second demodulator 19. For the NTSC signal, with a relative conversion amplification of unity in the synchronous demodulator 19, F is to be set at 2.03.

At the output the demodulator 18 a signal appears of the shape:

$$E_{R-Y}=\sum_{\omega_p=\omega_1}^{\omega_2}(R-Y)\cos\omega_p t+\sum_{\omega_p=\omega_a}^{\omega_3}(0.57R-0.30B-0.27G)\cos\omega_p t \qquad (16)$$

At the output of the demodulator 19 a signal appears of the shape:

$$E_{B-Y}=\sum_{\omega_p=\omega_1}^{\omega_2}(B-Y)\cos\omega_p T+\sum_{\omega_p=\omega_2}^{\omega_3}(-0.66R+0.35B+0.31G)\cos\omega_p t \qquad (17)$$

From these two signals a stage 23 derives the green colour difference signal $(G-Y)$ of the shape:

$$E_{G-Y}=\sum_{\omega_p=\omega_1}^{\omega_2}(G-Y)\cos\omega_p t+\sum_{\omega_p=\omega_2}^{\omega_3}(-0.17R+0.09B+0.08G)\cos\omega_p t \qquad (18)$$

since in the NTSC system we have:

$$E_{G-Y}=-0.19E_{B-Y}-0.51E_{R-Y}$$

From the Equations 16, 17 and 18 it follows that the higher modulation frequencies are of particular importance for the red and blue colour difference signals and in a greatly lesser degree for the green colour difference signal, since the higher modulation frequencies appear only with small amplitudes.

The colour difference signals represented by the Equations 16, 17 and 18 are applied through leads 24, 25 and 26 to the three control grids of the three guns of the display tube 11 and the brightness signal Y is applied to the cathodes, so that a coloured picture is displayed on the screen of the tube 11. Owing to the fact that the higher modulation frequencies are included, small colour details can be faultlessly reproduced in this picture, resulting in a sharp transition from one colour area to the other.

In FIG. 6, which shows a part of a colour television receiver using a chromatron display tube, like components are designated by numerals corresponding to those of FIG. 5.

As described hereinbefore, a signal $E_{ot}$ as represented by the Equation 15 is produced at the output of the filter 7. This signal is applied to an elliptical amplifier 27. This elliptical amplifier may be designed as described in United States patent application 3,238,292 and as its output signal delivers the desired monochrome signal and the dot-sequential signal together with an unwanted component, which may be eliminated with the aid of an additional stage 28.

For this purpose not only the signal $E_{ot}$ but also, through a line 29, a signal of the shape:

$$G_o\cos(\omega_s t+\varphi)+H_o\cos(2\omega_s t+\epsilon) \qquad (19)$$

must be applied to the elliptical amplifier 27.

The term $G_o\cos(\omega_s t+\varphi)$ ensures that the signal $E_{ot}$ is converted into a monochrome correction signal $$(M-Y)K_3$$

where $K_3$ is a constant determined by the conversion process. To obtain the desired monochrome signal $$(M-Y)K_3$$

$\varphi$ must be made $-71°$. That is to say, the conversion to the desired monochrome signal, which in actual fact is synchronous demodulation, is effected at an angle of $-71°$ relative to the positive $y$ axis or, what is the same thing, at an angle of $+19°$ relative to the positive $x$-axis, and consequently at an angle neither in the I direction (the I direction is at an angle of 123° to the positive $x$-axis) nor in the Q direction (the Q direction is at an angle of 33° to the positive $x$-axis). Nevertheless the conversion at an angle of $+19°$ relative to the positive $x$-axis may be faultlessly effected, because the signal $E_{ot}$ entirely is a double-sideband signal.

The term $H_o\cos(2\omega_s t+\epsilon)$ serves to convert the signal $E_{ot}$ into a signal of the shape:

$$K_3\{0.89(R-Y)\cos(\omega_s t+\delta)+0.74(B-Y)\sin(\omega_s t+\delta-2°)\} \qquad (20)$$

and, at least for the frequency range between the angular frequencies $\omega_1$ and $\omega_2$, this is just the dot-sequential signal for the display of the colour signal in a single gun colour display tube. Since for the conversion of the signal $E_{ot}$ into the dot-sequential signal for the low modulation frequencies the angle is given the correct value, this conversion angle automatically is correct for the frequency range between the angular frequencies $\omega_2$ and $\omega_3$, since at the transmitter end the I signal has the correct composition (cf. "Principles of Colour Television" of the Hazeltine Laboratory edited by K. MacIlwain and C. E. Dean, page 444, first paragraph).

A calculation shows that in order to convert the signal represented by the Equation 15 into a signal represented by the Equation 20, $\delta$ must be equal to 1° 12′ and $\epsilon$ to 175° 15′.

The angle $\epsilon=175°\ 15'$ is the angle relative to the positive $y$-axis (cosine function) and in this case also the conversion can be effected faultlessly owing to the fact that the signal $E_{ot}$ entirely is a double sideband signal. That is to say, in this case also, owing to the fact that the higher modulation frequencies are co-transmitted, a coloured picture having faultless small colour details and sharp transitions from one colour area to the other can be displayed by means of a single-gun display tube.

As described hereinbefore, the monochrome portion of the signal taken from the elliptical amplifier 27 is given by: $K_3(M-Y)$.

Since, however, a signal of the shape $K_3M$ is to be applied to the control grid of the display tube 30, the brightness signal Y is to be multiplied by a factor $K_3$. This may be performed in the amplifier 10, after which the signal $K_3Y$ is applied to the addition stage 33, in which it is added to the signal taken from the elliptical amplifier 27.

Further portions of the receiver required for satisfactory operation will now be described.

As has been set forth hereinbefore, the signal represented by the Equation 19 must be applied to the elliptical amplifier 27 through the lead 29. A signal as represented by the Equation 9 is taken from the terminal 6. In a phase shifting network 34 this signal is converted into a signal of the shape $H_o\cos(2\omega_s t+\epsilon)$, which is applied to the addition stage 35. To this stage 35 is also applied a signal of the shape $G_o\cos(\omega_s t+\varphi)$ taken from an output terminal 36 of the oscillator 16, and addition of this signal to the signal taken from the stage 34 produces the desired signal to be applied through the lead 29 to the elliptical amplifier 27.

As has been set forth hereinbefore, the elliptical amplifier 27 delivers an unwanted component also. This is due to the following effect.

If for the sake of simplicity the normal amplification and the conversion amplification are both assumed to be unity, the output signal of the amplifier 27 is:

$$E_{ot}+G_o\cos(\omega_s t+\varphi)+H_o\cos(2\omega_s t+\epsilon)+E_{ot}\cdot G_o\cos(\omega_{st}+\varphi)+E_{ot}\cdot H_o\cos(2\omega_s t+\epsilon)$$

The terms $E_{ot}$ and $E_{ot}\cdot H_o\cos(2\omega_s t+\epsilon)$ together give the signal determined by the Equation 20. This signal includes a signal at the angular frequency $3\omega_s$ also, however, this signal is not transmitted by a lowpass filter which is connected in the output circuit of the amplifier 27 and eliminates signals at angular frequencies above $(\omega_s+\omega_p)$. The term $E_{ot}\cdot G_o\cos(\omega_s t+\varphi)$ provides a monochrome signal $K_3(M-Y)$. This includes a signal at the angular frequency $2\omega_s$, however, this signal is also eliminated by the said filter connected in the output circuit of the amplifier 27. Of the remaining unwanted components represented by the terms $G_o\cos(\omega_s t+\varphi)$ and $H_o\cos(2\omega_s t+\epsilon)$, the latter is eliminated by the said filter connected in the output circuit of the amplifier 27.

The former of the said two terms is eliminated by applying a signal of the shape $-G_o\cos(\omega_s t+\varphi)$ to the stage 28. For this purpose, the signal taken from the terminal 36 is inverted in phase in the phase inverter stage 37 and then applied to a control electrode of the stage 28, which may be a triode and the amplification of which is made equal to that of the amplifier 27 with respect to the direct transmission of the signal $G_o\cos(\omega_s t+\varphi)$.

Finally a signal 38 must be applied to the cathode of the tube 30. This signal at a fundamental frequency $f_s(\omega_s=2\pi f_s)$ is delayed and limited in a delay circuit 39 so that only the peaks projecting above the broken line control the cathode of the tube 30 in such a positive manner with respect to the control grid potential that the electron beam in the display tube 30 is suppressed. This is necessary because the signal applied to the colour control grid 32 wobbles the electron beam over the three colour strips for displaying the red, blue and green colours, however, during each period of this colour control signal the electron beam sweeps twice over the control strip. During its second passage the electron beam must be suppressed, and this is effected by the signal 38. This process is extensively described in British patent specification 866,569.

The colour control signal for the colour control grid 32 is obtained by amplifying the signal taken from the terminal 20 in an amplifier 40, in which its phase is also shifted so that the signal represented by the Equation 20 is reproduced without colour deviations.

Hereinbefore it has been set forth that if the mixer stage 3 is used in the colour television receivers of FIGS. 5 and 6, it must be a push-pull mixer stage. A push-pull mixer stage may comprise two tubes, however, FIG. 7 shows a possible embodiment in which the stage 3 comprises a single multigrid tube 3. This figure also shows how the mixer stage 1 may be a multigrid tube 1.

The operation of the embodiment of FIG. 7 is as follows. The signal $E_{chr}$ is applied through the delay line 13 to the first control grid 41 of the tube 1, and the signal represented by the Equation 9 is applied to the second control grid 42. The signal $E_{chr}$ is also applied, through the filter 2, to the first control grid 43 of the tube 2, so that at this control grid a signal as represented by the Equation 11 is set up. This signal is also applied, through a transformer 44 which inverts its phase, to the second control grid 45 of the tube 3 with an amplitude such that a direct transmission of this signal and of the signal applied to the first control grid 43 is out of the question. The signal represented by the Equation 13 is also applied to the second control grid 45.

In this case there is also intermodulation between the signal delivered by the filter 2 and applied to the control grid 43 and the signal applied to the control grid 45, however, this intermodulation product produces no voltage drop across the common filter 7 tuned to the angular frequency $\omega_s$.

The intermodulation product due to multiplication mixing of the signals represented by the Equations 11 and 13 applied to the control grids 43 and 45 produces the desired signal $E_{o3}$ as represented by the Equation 14. If there should be additive mixing of the two signals applied to the second control grid 45, that is to say, the signals applied through the transformer 44 and that taken from the phase inverter stage 8, this produces a modulation product equal to that produced by the multiplicative mixing, however, with opposite phase. By making the conversion amplification produced by the multiplicative mixing larger than that produced by the additive mixing to an extent such that the overall conversion amplification is again $K_1$, the desired signal $E_{o3}$ is again obtainable.

Obviously, in the mixer stage 3 no steps for producing push-pull operation may be taken. In this event, direct amplification is effected in the mixer stage 3. Equation 14 shows, however, that due to the conversion in the mixer stage 3 the I component is transmitted with a negative sign. Since in the case of direct amplification the I component is transmitted with a positive sign, it may be arranged that the total amplitude of the I component in the output signal $E_{ot}=E_{o1}+E_{o3}$ for the range between the angular frequencies $\omega_1$ and $\omega_2$ is made equal to the amplitude of the I component for the range between the angular frequencies $\omega_2$ and $\omega_3$. This may be achieved by increasing the amplitude of the signal at twice the sub-carrier frequency applied to the mixer stage 3 by an amount such with respect to the amplitude of the signal represented by the Equation 13 that the direct amplification of the I component in the mixer stage 3 is compensated for.

Since, however, the Q component is transmitted with a positive sign due to the conversion in the mixer stage 3, this possibility of compensation is not present for the Q component. As a result, in the final output signal $E_{ot}$ the Q component will have a larger amplitude with respect to the I component than in the incoming signal $E_i$ represented by the Equation 8.

For synchronous detection, however, this need not be a disadvantage, since synchronous detection in the I and Q directions remains possible without cross talk (all the signals being double-sideband signals), but the amplification in the synchronous demodulator for the Q direction must be smaller than in the synchronous demodulator for the I direction in order to compensate for the increased Q component in the signal $E_{ot}$.

In the receiver of FIG. 6, the signal ultimately applied to the control grid of the display tube 30, which signal includes both the monochrome component and the dot-sequential signal, is a completely faultless signal. However, this requires not only the mixer stages 1 and 3 for restoring the missing sideband of the I signal but also the elliptical amplifier 27 and the compensating stage 28. According to a further feature of the invention, the amplifier 27 and the stage 28 may be omitted by performing the elliptical amplification in the mixer stages 1 and 3.

This will now be described. We begin with the production of the dot-sequential signal as such, that is to say, without the production of the monochrome component $(M-Y)$. The signals at the angular frequency $\omega_s$ taken from the output terminal 36 are first disregarded, so that it may be assumed that in addition to the signal $E_{chr}$ applied through the delay circuit 13 the signal determined by the Equation 9 is applied to the mixer stage 1. Assuming the conversion factor of the stage 1 to be $K_1$, in this arrangement also the signal $E_{o1}$ determined by the Equation 10′ appears at the output of the stage 1.

In addition to the signal applied through the filter 2, the signal taken from the stage 8, which in this case is a phase shifting network, and having the shape $\cos(2\omega_s+\gamma)$ is applied to the mixer stage 3.

Assuming the direct amplification of the stage 3 to be $K_4$ and the conversion factor to be $K_5$, the signal determined by the Equation 11 is multiplied by a factor:

$$K_4+K_5\cos(2\omega_s t+\gamma)$$

Hence, allowing for the filter 7, the output signal of the mixer stage 3 may be written:

(21)

$$E_{o3}'=K_4\Bigg[\sum_{\omega_p=\omega_1}^{\omega_2} I\,[\cos\{(\omega_s+\omega_p)t+\psi\}+\cos\{(\omega_s-\omega_p)t+\psi\}]+\sum_{\omega_p=1\omega}^{\omega_2} Q\,[\sin\{(\omega_s+\omega_p)t+\psi\}+\sin\{(\omega_s-\omega_p)t+\psi\}]\Bigg]$$
$$+K_5\Bigg[\sum_{\omega_p=\omega_1}^{\omega_2}\frac{I}{2}\,[\cos\{(\omega_s-\omega_p)t+\gamma-\psi\}+\cos\{(\omega_s+\omega_p)t+\gamma-\psi\}]-\sum_{\omega_p=\omega_1}^{\omega_2}\frac{Q}{2}\,[\sin\{(\omega_s-\omega)t+\gamma-\psi\}$$
$$+\sin\{(\omega_s+\omega_p)t+\gamma-\psi\}]\Bigg]$$

Similarly to what has been described with respect to the preceding embodiments, the output signals of the stages 1 and 3 are added in the common output circuit, which includes the filter 7, so that an output signal of the shape $E'_{ot}=E_{o1}+E'_{o3}$ is produced. With respect to the low modulation frequencies, that is to say, with respect to the range between the angular frequencies $\omega_1$ and $\omega_2$, the output signal $E'_{ot}$ must be equal to the signal represented by the Equation 20.

Since in the NTSC system the I and Q signals may be written:

$$I=-0.268(B-Y)+0.736(R-Y)$$

and $$Q=0.413(B-Y)+0.478(R-Y)$$

equating the signal $E'_{ot}$ with the signal represented by the Equation 20 results in the following four equations:

$$0.147K_1+0.492K_4-0.245K_5 \cos \gamma = K_3 0.740 \cos (\delta-2°) \quad (22)$$

$$0.620K_1+0.878K_4+0.439K_5 \cos \gamma=K_3 0.890 \cos \delta \quad (23)$$

$$-0.266K_1-0.246K_5 \sin \gamma=K_3 0.740 \sin (\delta-2°) \quad (24)$$

$$-0.403K_1-0.439K_5 \sin \gamma=-K_3 0.890 \sin \delta \quad (25)$$

These four equations have six unknown quantities, namely $K_1$, $K_3$, $K_4$, $K_5$, $\gamma$ and $\delta$. However, the unknown quantity $K_3$ is a pure multiplication factor which determines the ultimate amplitude of the converted signal but not the relationship between the various colour components. Consequently it may be assumed that $K_3=1$ without influencing the result of the calculation. Thus five unknown quantities remain.

The requirements to be satisfied by the conversion entail that two of these quantities can be freely chosen, for the contribution to the I component of the entire output signal $E_{ot}$ provided by the mixer stage 3 has to match the contribution to this I component provided by the mixer stage 1. This results in the requirement $\delta=0°$, because the phase of the I signal is not changed in the mixer stage 1.

However, the amplitude of the contribution to the I component provided by the mixer stage 1 is also required to match the amplitude of the dot-sequential signal to be produced. This involves a requirement concerning the value of $K_1$.

Generally, with four equations having five unknown quantities, only one unknown quantity may be freely chosen. In this particular case, however, the two above mentioned requirements may be satisfied with only a slight deviation.

A consideration of the Equations 24 and 25 shows the following. Multiplication of the Equation 25 by a factor 0.226/0.403 gives:

$$-0.226K_1-0.246K_5 \sin \gamma=-0.498 \sin \delta \cdot K_3 \quad (25')$$

The left-hand side of the Equation 25′ is equal to the left-hand side of the Equation 24 so that we have:

$$0.740 \sin (\delta-2°)=-0.498 \sin \delta$$

from which it follows that $\delta=1° \ 15'$.

The value found for $\delta$ differs so little from the desired value 0°, that the resulting fault in the output signal $E'_{ot}$ is negligible.

That the ratios between the coefficient of the left-hand sides of the Equations 24 and 25 are equal, is due to the fact that in the NTSC signal the components Q and I modulate the sub-carrier in quadrature in a manner such that, if the modulated signal is not expressed in the components I and Q but in the components $(R-Y)$ and $(B-Y)$, the components $(R-Y)$ and $(B-Y)$ modulate the sub-carrier in quadrature, that is to say, at right angles to one another.

As the Equation 20 shows, in the desired dot-sequential signal there is a phase difference of 92° between the $(R-Y)$ and the $(B-Y)$ components. This small difference from the 90° relation obtaining in the NTSC signal results in that the value found for $\delta$ from the Equations 24 and 25 has a negligible difference from 0°.

Thus, three equations with four unknown quantities $K_1$, $K_4$, $K_5$ and $\gamma$ remain. It has already been proved hereinbefore that preferably the factor $K_1$ is also freely chosen, for, as set forth hereinbefore, correct conversion of the incoming colour signal requires both the amplitude and the phase of this signal to be varied. This is effected in the mixer stage 3 for the range of the angular frequencies between $\omega_1$ and $\omega_2$, the angle $\gamma$ being chosen so that the output signal $E_{o3}'$ together with the portion of the signal $E_{o1}$ for the said angular frequencies just gives the signal represented by the Equation 20.

The portion of the signal $E_{o1}$ for the angular frequencies between $\omega_2$ and $\omega_3$, however, is only multiplied by a factor $K_1$ but not shifted in phase. Hence the conversion performed in the stages 1 and 3 of FIG. 8 is not faultless but includes slight deviations with respect to the higher modulation frequencies.

These deviations, however, are particularly small, for the original NTSC signal may be written:

$$0.880(R-Y) \cos \omega_s t+0.492(B-Y) \sin \omega_s t \quad (26)$$

while with the use of the value found for $\delta$ of 1° 15′, the dot-sequential signal according to the Equation 20 becomes:

$$0.89(R-Y) \; cos \; (\omega_s t+1° \ 15')+0.74(B-Y) \sin (\omega_s t-45') \quad (20')$$

A comparison of the Equations 26 and 20′ shows that for the $(R-Y)$ direction of the amplitude of the dot-sequential signal is substantially equal to that of the original NTSC signal, while the angular deviation of 1° 15′, is particularly small. For the $(B-Y)$ direction the difference from the angle 45′ is also particularly small, however, the amplitude is greatly different. From this it follows that the desired signal as expressed by the Equation 20′ is nearly obtainable by not shifting the NTSC signal in phase but only amplifying the $(B-Y)$ component.

This results in that the error made by not shifting the portion of the signal $E_{o1}$ for the angular frequencies between $\omega_2$ and $\omega_3$ in phase but only varying its amplitude, may be maintained very small. It is found that, if the factor $K_1$ is given a value of about 2.2, the higher modulation frequencies for the $(R-Y)$ direction are displayed substantially exactly. It is also found that, if the factor $K_1$ is given a value of 2.8, the higher modulation frequencies for the $(B-Y)$ direction are displayed substantially exactly. Consequently, by choosing a value which is the average of the above mentioned values 2.2 and 2.8, the higher frequencies will not be exactly displayed, neither for the $(R-Y)$ direction nor for the $(B-Y)$ direction, however, the error made will be very slight.

Matching for the $(G-Y)$ direction in this case will not be quite satisfactory, but this is substantially immaterial since the contribution of the higher modulation frequencies for this direction is only small. This is shown by a comparison of the Equation 18 with the Equations 16 and 17 with respect to the contribution of the higher modulation frequencies.

When $K_1$ is chosen in the above described manner, the three remaining Equations 22, 23 and 24 can be solved for the unknown quantities $K_4$, $K_5$ and $\gamma$.

Summarising the above we may state that owing to the recognition of the fact that in the system of the above four equations two equations in corresponding sides (the left-hand sides of the Equations 24 and 25) have coefficients showing equal ratios, due to the fact that the incoming signal two of the three colour difference signals modulate the sub-carrier in quadrautre, the amplification of the higher frequencies may still be freely chosen in the mixer stage 1 so that the fine colour details are displayed with only slight errors. Thus, in the receiver of FIG. 8 an additional elliptical amplifier 27 and a compensating stage 28 with the associated circuit elements, as used in the receiver of FIG. 6, may be dispensed with.

In the receiver of FIG. 8, however, the received NTSC signal is converted not only into a dot-sequential signal but also into a monochrome signal $(M-Y)$. This is possible by applying to the mixer stage 1 not only the signal 2 cos $(2\omega_s t+2\psi)$ but also a signal $-G_o$ cos $(\omega_s t+\varphi)$ and applying to the mixer stage 3 not only the signal cos $(2\omega_s t+\gamma)$ but also a signal of the shape $G_o$ cos $(\omega_s t+\varphi)$. This is achieved in a simple manner by adding the two signals from the oscillator 16 for the mixer stage 1 in an adder stage 46 and adding the signals from the oscillator 16 for the mixer stage 3 in an adder stage 47. A A possible embodiment of the mixer stages 1 and 3 for use in a receiver of FIG. 8 is shown in FIG. 9. The signal $E_{chr}$ is applied, through the delay line 13, to the first control grid 41 of the tube 1 and the signal:

$$-G_o \cos (\omega_s t+\varphi)+2 \cos (2\omega_s t+2\psi)$$

from the adder stage 46 is applied to the second control grid 42. The signal $E_{chr}$ is applied, through the filter 2, to a first control grid 43 of the tube 3 and the signal:

$$G_o \cos (\omega_s t+\varphi)+\cos (2\omega_s t+\gamma)$$

from the adder stage 47 is applied to a second control grid 45.

The significance of the signals having the angular frequency $2\omega_s$ has been extensively set forth hereinbefore. Together with the applied signal $E_{chr}$ these signals produce the desired dot-sequential signal across the filter 7. The signal $G_o$ cos $(\omega_s t+\varphi)$ applied to the tube 3 serves to convert the signal $E_{chr}$ into a monochrome correction signal $(M-Y)$, for the product signal $E_{chr} \cdot G_o(\omega_s t+\varphi)$ includes a term containing only the modulation frequencies of the signal $E_{chr}$. This term produces a voltage drop across a resistor 48 and this is the desired monochrome signal $(M-Y)$. The resistor 48 is shunted by a capacitor 49 to enable the angular frequency $\omega_s$ to be transmitted to the filter 7.

The above mentioned product signal includes the angular frequency $2\omega_s$ also. This frequency, however, is short circuited by capacitor 49 and produces no voltage drop across the filter 7 tuned to the angular frequency $\omega_s$.

Thus, the desired output signal $E_{ot}'$, which includes the monochrome correction component and the dot-sequential signal, is produced across the series connection of the resistor 48 and the filter 7, and this signal is applied through a lead 50 to the adder stage 33, in which the brightness signal I is added to the signal $E_{ot}'$.

In the mixer stage 3 no quadrature cross talk occurs, since the filter 2 has eliminated the higher modulation frequencies from the signal $E_{chr}$. This means, however, that these higher modulation frequencies are not included any longer in the converted monochrome signal $(M-Y)$ either. As has been proved hereinbefore with reference to the receiver of FIG. 6, the demodulation of the $(M-Y)$ signal, which in actual fact is a synchronous demodulation, is performed in a direction at an angle of $+19°$ to the positive $x$-axis. The I signal is at an angle of $123°$ to the positive $x$-axis. Hence, it will be appreciated that the entire contribution of the I signal, and consequently the contribution of the higher modulation frequencies of the I signal, to the obtained $(M-Y)$ signal is very small. As a result, the error made in the production of the $(M-Y)$ signal in the mixer stage 3 is very slight.

The signal $-G_o$ cos $(\omega_s t+\varphi)$ applied to the tube 1 will also produce a product signal $-G_o$ cos $(\omega_s t+\varphi).E_{chr}$ in this tube. Since, however, no ohmic resistance is included in the anode lead of the tube 1, the terms of this signal containing only the modulation frequencies of the signal $E_{chr}$ cannot be present in the output signal $E_{ot}'$. The signal $-G_o$ cos $(\omega_s t+\varphi)$ consequently is only applied to the second control grid 42 to compensate for the directly transmitted signal $G_o$ cos $(\omega_s t+\varphi)$ which is applied to the control grid 45 and cannot be eliminated by the filter 7.

It goes without saying that, if desired, the signal $G_o$ cos $(\omega_s t+\varphi)$ may be applied to the control grid 42 and the signal $-G_o$ cos $(\omega_s t+\varphi)$ may be applied to the control grid 45, in which case the parallel combination of the resistor 48 and the capacitor 49 is to be included in the anode lead of the tube 1 instead of in the anode lead of the tube 3. In this case the monochrome component containing the higher modulation frequencies is set up at the anode of the tube 1. However, no quadrature cross talk occurs in the production of this monochrome signal, because the signal $E_{chr}$ applied to the control grid 41 is not completely a double-sideband signal.

Consequently, if it is not desired to co-transmit the higher modulation frequencies, the solution of the FIG. 9 is to be chosen.

If it is preferred, however, to co-transmit the higher modulation frequencies and the resulting error due to quadrature cross talk is accepted, the last solution to be described is to be chosen.

What is claimed is:

1. A circuit for the reception of partially single-sideband signals comprising a source of said signals, and means for restoring the missing sideband of said signals, said means comprising first and second mixing means, means providing oscillations of twice the frequency of the carrier on which said signals are modulated, means applying said partially single-sideband signals to said first mixing means, means applying only the double-sideband portion of said signals to said second mixing means, means applying said oscillations to said first and second mixing means with opposite phases, and means for adding the uninverted outputs of said first and second mixing means to produce a double-sideband signal.

2. A circuit for the reception of partially single-sideband signals comprising a source of said signals, and means for restoring the missing sideband of said signals, said means comprising first and second mixing means, means providing oscillations of twice the frequency of the carrier on which said signals are modulated, means applying said single-sideband signals and said oscillations to said first mixing means, said first mixing means having a direct amplification that is half the conversion amplification, means applying only the double-sideband portion of said signals to said second mixing means, means applying said oscillations to said second mixing means in phase opposition to the oscillations applied to said first mixing means and with an amplitude substantially twice the amplitude of oscillations applied to said first mixing means, and means for adding the outputs of said mixing means without relative phase inversion.

3. A circuit for the reception of color television signals of the type having a first component which relates primarily to the brightness of a scene, and a second component consisting of a sub-carrier modulated in quadrature by first and second signals relating to the color content of said scene, said first signal being a wide-band signal which modulates said subcarrier as a pure double-sideband signal with respect to lower modulation frequencies and as a single-sideband signal for higher modulation frequencies, said second signal being a narrow band signal which modulates said sub-carrier as a pure double-sideband signal, said circuit comprising a source of said television signals, first and second mixing means, means for providing oscillations of twice the frequency of said sub-carrier and of a phase that is twice the phase at which said first signal modulates said sub-carrier, means applying said oscillations in one phase and said second component to said first mixing means, said first mixing means having a direct amplification that is one-half of its total conversion amplification, low pass filter means for applying only lower modulation frequencies of said second component to said second mixing means, means applying said oscillations with opposite phase to said second mixing means, and means for adding the output signals of said first and second mixing means without relative phase inversion.

4. The circuit of claim 3 in which said first and second mixing means comprise first and second multigrid tubes respectively, each having first and second control grids and an anode, said second component being applied directly to the first control grid of said first tube, and by way of said low pass filter means to the first control grid of said second tube, said oscillations being applied with opposite phases to the second control grids of said first and second tubes, comprising phase inverting means connected between the first and second control grids of said second tube, said adding means comprising common impedance means connected to the anodes of said first and second tubes.

5. The circuit of claim 4 in which the normal and conversion amplification of said first tube is adjusted with respect to the normal and conversion amplification of said second tube so that the amplitude of the wide-band pure double-sideband signal at the output of said adding means is equal to the amplitude of said second signal for all modulation frequencies.

6. The circuit of claim 3 comprising first and second synchronous demodulator means, means for regenerating said subcarrier, means applying the output of said adding means to said first and second demodulator means, and means for applying said regenerated sub-carrier with different phases to said first and second demodulator means to reproduce first and second color signals respectively.

7. The circuit of claim 3 comprising conversion means connected to the output of said adding means for converting the sum of the outputs of said first and second mixing means to a signal suitable for application to a control electrode of a single gun color picture tube.

8. The circuit of claim 3 in which the normal and conversion amplification of said first mixing means is adjusted with respect to the normal and conversion amplification of said second mixing means, and the phase of said oscillations applied to said second mixing means is adjusted so that the signal output of said adding means is a dot sequential signal suitable for application to a control electrode of a single gun color picture tube.

9. The circuit of claim 8 in which said first and second mixing means are first and second multigrid tubes each having first and second control grids and an anode, comprising means applying said second component to the first control grid of said first tube, said second component being applied by way of said filter means to the first control electrode of said second tube, comprising means applying said oscillations with opposite phases to the second control grids of said first and second tubes, a source of operating potential, a filter tuned to the frequency of said sub-carrier connected between the anode of said first tube and said source of operating potential, a resistor connected between the anodes of said first and second tubes, and output circuit means connected to the anode of said second tube.

10. The circuit of claim 8 in which said first and second mixing means are first and second multigrid tubes each having first and second control grids and an anode, comprising means applying said second component to the first control grid of said first tube, said second component being applied by way of said filter means to the first control electrode of said second tube, comprising means for regenerating said sub-carrier, means for applying said oscillations in the same phase to the second control grids of said first and second tubes, means applying said regenerated sub-carrier with opposite phases to the second control grids of said first and second tubes, a source of operating potential, resistor means connected between the anodes of said first and second tubes, a filter tuned to the frequency of said subcarrier connected between the anode of said first tube and said source of operating potential, and output circuit means connected to the anode of said second tube.

References Cited by the Examiner

UNITED STATES PATENTS

| | | | |
|---|---|---|---|
| 2,890,273 | 6/1959 | Loughlin | 178—5.4 |
| 2,987,617 | 6/1961 | Loughlin | 178—5.4 |
| 3,238,292 | 3/1966 | Van Odenhoven et al. | 178—5.4 |

DAVID G. REDINBAUGH, *Primary Examiner.*

J. A. O'BRIEN, *Assistant Examiner.*